(12) United States Patent
Tanaka

(10) Patent No.: US 7,453,503 B2
(45) Date of Patent: Nov. 18, 2008

(54) PIXEL INTERPOLATION METHOD

(75) Inventor: Yoshiko Tanaka, Tokyo (JP)

(73) Assignee: Uniden Corporation, Tokyo (JP)

( * ) Notice: Subject to any disclaimer, the term of this patent is extended or adjusted under 35 U.S.C. 154(b) by 739 days.

(21) Appl. No.: 11/176,630

(22) Filed: Jul. 7, 2005

(65) Prior Publication Data

US 2006/0209199 A1 Sep. 21, 2006

(30) Foreign Application Priority Data

Mar. 17, 2005 (JP) ............................ 2005-077667

(51) Int. Cl.
H04N 9/64 (2006.01)
(52) U.S. Cl. .................. 348/246; 348/273; 348/241; 382/272; 382/275; 382/162
(58) Field of Classification Search ............... 348/246, 348/247, 272, 273, 275, 266, 222.1, 223.1, 348/225.1, 228.1; 382/300, 296, 289, 266, 382/162, 149, 272, 275

See application file for complete search history.

(56) References Cited

U.S. PATENT DOCUMENTS

| | | | |
|---|---|---|---|
| 5,629,734 A | 5/1997 | Hamilton et al. | |
| 5,652,621 A | 7/1997 | Adams et al. | |
| 5,805,216 A * | 9/1998 | Tabei et al. | 348/246 |
| 6,681,054 B1 * | 1/2004 | Gindele | 382/272 |
| 6,741,754 B2 | 5/2004 | Hamilton | |
| 6,744,916 B1 * | 6/2004 | Takahashi | 382/162 |
| 6,900,836 B2 * | 5/2005 | Hamilton, Jr. | 348/241 |
| 7,053,944 B1 * | 5/2006 | Acharya et al. | 348/273 |
| 7,206,020 B2 * | 4/2007 | Kato | 348/247 |
| 7,362,897 B2 * | 4/2008 | Ishiga | 382/167 |
| 2002/0196354 A1 * | 12/2002 | Chang et al. | 348/246 |

OTHER PUBLICATIONS

Gonzalo R. Arce & Michael P. McLoughlin, Theoretical Analysis of the Max/Median Filter, (IEEE Transactions on Acoustic Speech, and Signal Processing, vol. ASSP-35, No. 1), (Jan. 1987), pp. 60-69.*

* cited by examiner

Primary Examiner—Lin Ye
Assistant Examiner—Nelson D Hernández Hernández
(74) Attorney, Agent, or Firm—Steven J. Hultquist; Intellectual Property / Technology Law

(57) ABSTRACT

A method for interpolating image data captured by an electronic imaging device having a Bayer arrangement, by pixel interpolation involving interpolating interpolation pixel X33 (a green pixel), determining the average value of the neighboring pixels situated peripherally to the interpolation pixel X33 by equation (1), and determining the median values of the green pixels in the horizontal direction, the oblique direction and the reverse oblique direction including the interpolation pixel X33 by equations (2), (3) and (4), respectively:

$$ave = (G22 + G24 + G42 + G44)/4; \quad (1)$$

$$horiz = median(G31, (G22+G42)/2, (G24+G44)/2, G35); \quad (2)$$

$$Slash = median(G15, G24, G42, G51); \text{ and} \quad (3)$$

$$Bslash = median(G11, G22, G44, G55). \quad (4)$$

The value of these median values having the smallest differential with respect to the average value is taken to be the pixel data for the green pixel situated at the position of X33.

2 Claims, 3 Drawing Sheets

FIG.2

| G11 | R12 | X   | R14 | G15 |
|-----|-----|-----|-----|-----|
| B21 | G22 | X   | G24 | B25 |
| G31 | R32 | X33 | R34 | G35 |
| B41 | G42 | X   | G44 | B45 |
| G51 | R52 | X   | R54 | G55 |

FIG.3

| R11 | G12 | X   | G14 | R15 |
|-----|-----|-----|-----|-----|
| G21 | B 22 | G23 | B24 | B25 |
| R31 | G32 | X33 | G34 | R35 |
| G41 | B42 | G43 | B44 | G45 |
| R51 | G52 | X   | G54 | R55 |

FIG.4

| G11 | R12 | X   | R14 | G15 |
|-----|-----|-----|-----|-----|
| B21 | G22 | X23 | G24 | B25 |
| G31 | R32 | X33 | R34 | G35 |
| B41 | G42 | X   | G44 | B45 |
| G51 | R52 | X   | R54 | G55 |

PIXEL INTERPOLATION METHOD

CROSS-REFERENCES TO RELATED APPLICATIONS

This application relates to and claims priority from Japanese Patent Application No. 2005-077667, filed on Mar. 17, 2005, the entire disclosure of which is incorporated herein by reference.

BACKGROUND

The present invention relates to a pixel interpolation method for image data captured by an electronic imaging device having a Bayer arrangement.

Conventionally known methods for interpolating pixels in image data obtained by A/D conversion of capture data captured by a CCD sensor having a Bayer arrangement of pixels include, for example, a pixel interpolation method based on simple average calculation, a method for correcting pixel values by applying a multiplication coefficient to faulty lines only, or various methods proposed in U.S. Pat. Nos. 6,741, 754, 5,652,621, and 5,629,734, and the like. For example, FIG. 5 shows an example in which capture data cannot be obtained from all of the pixels in one row of a Bayer arrangement, due to a fault in a CCD sensor, and hence a vertical mark appears in the image data. FIG. 4 shows a pixel arrangement having a Bayer arrangement. In the diagram, R indicates pixel data for a red pixel, G indicates pixel data for a green pixel, B indicates pixel data for a blue pixel, and X indicates pixel data for an interpolated pixel. On the basis of a pixel interpolation method based on simple average calculation, X23=(B21+B25), X33=(G31+G35).

SUMMARY

However, if the vertical mark in FIG. 5 is interpolated using a pixel interpolation method based on simple average calculation, then the simple average between white and black is obtained and therefore, a problem occurs in that the interpolated pixels will be gray, as illustrated in FIG. 6. Furthermore, in a method where the pixel values are corrected by multiplying a coefficient by a faulty line only, then if there is variation in the use conditions of the CCD sensor, such as the temperature, it may not be possible to correct values in an orderly fashion by means of one predetermined coefficient.

Therefore, it is an object of the present invention to overcome problems of this kind by proposing a method for interpolating image data captured by an electronic imaging device having a Bayer arrangement, in an orderly fashion.

In order to achieve the aforementioned object, the pixel interpolation method according to the present invention is a pixel interpolation method for interpolating image data for a green pixel captured by an electronic imaging device having a Bayer arrangement, wherein, taking the image data of a red pixel situated at row M and column N to be RMN, taking the image data of a green pixel situated at row M and column N to be GMN, taking the image data of a blue pixel situated at row M and column N to be BMN, and taking the image data of an interpolation pixel situated at row M and column N to be XMN; ave is calculated by: ave=(G(M−1)(N−1)+G(M−1)(N+1)+G(M+1)(N−1)+G(M+1)(N+1))/4; horiz is calculated by: horiz=median(GM(N−2),(G(M−1)(N−1)+G(M+1)(N−1))/2,(G(M−1)(N+1)+G(M+1)(N+1))/2,GM(N+2)); Slash is calculated by: Slash=median(G(M−2)(N+2),G(M−1)(N+1), G(M+1)(N−1),G(M+2)(N−2)); Bslash is calculated by: Bslash=median(G(M−2)(N−2),G(M−1)(N−1),G(M+1)(N+1),G(M+2)(N+2)); and the value of said horiz value, said Slash value and said Bslash value which produces the smallest differential with respect to said ave value is taken to be the image data of said interpolation pixel XMN. By means of this method, it is possible to interpolate image data captured by an electronic imaging device having a Bayer arrangement, in an orderly and satisfactory fashion. A CCD sensor, or the like, is suitable for the electronic imaging device.

Furthermore, the pixel interpolation method according to the present invention present invention is a pixel interpolation method for interpolating image data for either one of a blue pixel or a red pixel captured by an electronic imaging device having a Bayer arrangement, wherein, taking the image data of a red pixel situated at row M and column N to be RMN, taking the image data of a green pixel situated at row M and column N to be GMN, taking the image data of a blue pixel situated at row M and column N to be BMN, and taking the image data of an interpolation pixel situated at row M and column N to be XMN; GM(N−2) is calculated by: GM(N−2) =(G(M−1)(N−2)+G(M+1)(N−2))/2; CrM(N−2) is calculated by: CrM(N−2)=RM(N−2)−GM(N−2); GM(N+2) is calculated by: GM(N+2)=(G(M−1)(N+2)+G(M+1)(N+2))/2; CrM(N+2) is calculated by: CrM(N+2)=RM(N+2)−GM(N+2); GMN is calculated by: GMN=(G(M−1)N+GM(N−1)+GM(N+1)+G(M+1)N)/4; and XMN is calculated by: XMN= (CrM(N−2)+CrM(N+2))/2+GMN.

DESCRIPTION OF DRAWINGS

FIG. 2 is an illustrative diagram of pixel data having a Bayer arrangement;

FIG. 3 is an illustrative diagram of pixel data having a Bayer arrangement;

FIG. 4 is an illustrative diagram of pixel data having a Bayer arrangement;

DETAILED DESCRIPTION

Figure 1:
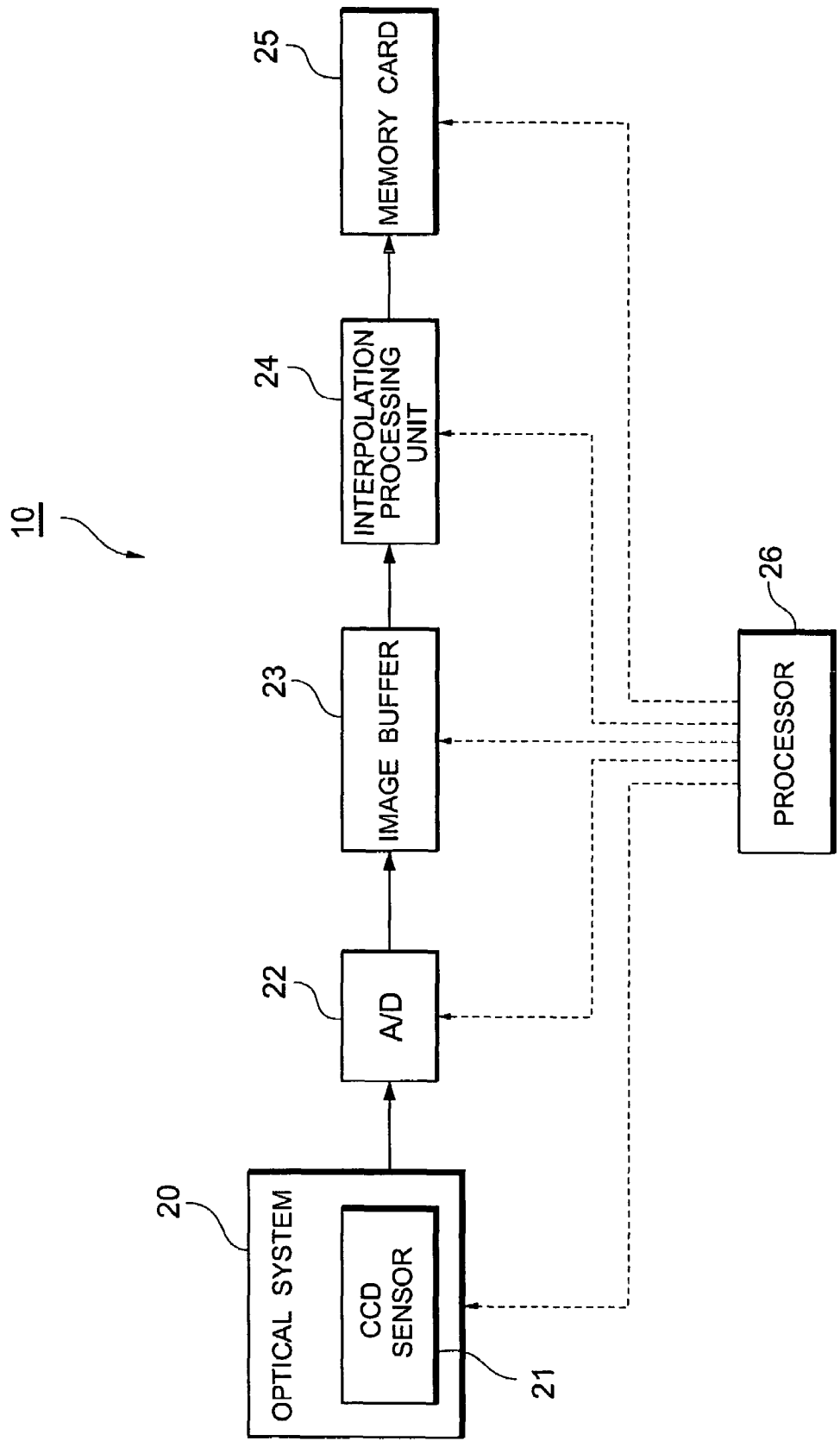
FIG. 1 is a diagram of the system composition of a digital camera according to the present embodiment.

FIG. 1 shows the system composition of a digital camera according to the present embodiment. The digital camera 10 comprises: an optical system 20 including a CCD sensor 21; an A/D converter 22 for converting capture data captured by the CCD sensor 21 from analog to digital, and outputting digital image data; an image buffer 23 for temporarily storing the digital image data; an interpolation processing unit 24 for interpolating the digital image data stored in the image buffer 23; a memory card 25 for storing the interpolated digital image data; and a processor 26 for controlling each of the aforementioned sections. The interpolation method implemented by the interpolation processing unit 24 is described in detail below.

(Method for Interpolating Green Pixels in Bayer Arrangement)

In the Bayer arrangement shown in FIG. 2, when interpolating interpolation pixel X33 (a green pixel), firstly, the average value of the neighboring pixels situated peripherally to the interpolation pixel X33 is determined by means of equation (1), whereupon the median values of the green pixels in the horizontal direction, the oblique direction and the reverse oblique direction including the interpolation pixel X33 are respectively determined by means of equation (2) to equation (4). The value of these median values which has the smallest differential with respect to the average value is taken to be the pixel data for the green pixel situated at the position of X33. Here, "median" is a function which finds the median value.

$$ave=(G22+G24+G42+G44)/4 \quad (1)$$

$$horiz=median(G31,(G22+G42)/2,(G24+G44)/2,G35) \quad (2)$$

$$Slash=median(G15,G24,G42,G51) \quad (3)$$

$$Bslash=median(G11,G22,G44,G55) \quad (4)$$

In the example described above, the pixel X33 in the third row and third column is interpolated, but equations (1) to (4) may be rewritten respectively as equations (5) to (8), by taking the image data of a red pixel situated at row M and column N to be RMN, taking the image data of a green pixel situated at row M and column N to be GMN, taking the image data of a blue pixel situated at row M and column N to be BMN, and taking the image data of an interpolation pixel situated at row M and column N to be XMN. Here, M and N are natural numbers.

$$ave=(G(M-1)(N-1)+G(M-1)(N+1)+G(M+1)(N-1)+G(M+1)(N+1))/4 \quad (5)$$

$$horiz=median(GM(N-2),(G(M-1)(N-1)+G(M+1)(N-1))/2,(G(M-1)(N+1)+G(M+1)(N+1))/2,GM(N+2)) \quad (6)$$

$$Slash=median(G(M-2)(N+2),G(M-1)(N+1),G(M+1)(N-1),G(M+2)(N-2)) \quad (7)$$

$$Bslash=median(G(M-2)(N-2),G(M-1)(N-1),G(M+1)(N+1),G(M+2)(N+2)) \quad (8)$$

(Method for Interpolating Red Pixels and Blue Pixels in Bayer Arrangement)

In the Bayer arrangement illustrated in FIG. 3, in order to interpolate the interpolation pixel X33 (a red pixel), firstly, the values G23, G43 of the green pixels are interpolated by means of the method described above. Thereupon, the image data for the red pixel situated at the position of X33 is calculated by using equation (9) to equation (14).

$$G31=(G21+G41)/2 \quad (9)$$

$$Cr31=R31-G31 \quad (10)$$

$$G35=(G25+G45)/2 \quad (11)$$

$$Cr35=R35-G35 \quad (12)$$

$$G33=(G23+G32+G34+G43)/4 \quad (13)$$

$$X33=(Cr31+Cr35)/2+G33 \quad (14)$$

In the example described above, the pixel X33 in the third row and third column is interpolated, but equations (9) to (14) may be rewritten respectively as equations (15) to (20), by taking the image data of a red pixel situated at row M and column N to be RMN, taking the image data of a blue pixel situated at row M and column N to be BMN, and taking the image data of an interpolation pixel situated at row M and column N to be XMN.

$$GM(N-2)=(G(M-1)(N-2)+G(M+1)(N-2))/2 \quad (15)$$

$$CrM(N-2)=RM(N-2)-GM(N-2) \quad (16)$$

$$GM(N+2)=(G(M-1)(N+2)+G(M+1)(N+2))/2 \quad (17)$$

$$CrM(N+2)=RM(N+2)-GM(N+2) \quad (18)$$

$$GMN=(G(M-1)N+GM(N-1)+GM(N+1)+G(M+1)N)/4 \quad (19)$$

$$XMN=(CrM(N-2)+CrM(N+2))/2+GMN \quad (20)$$

Figure 5:
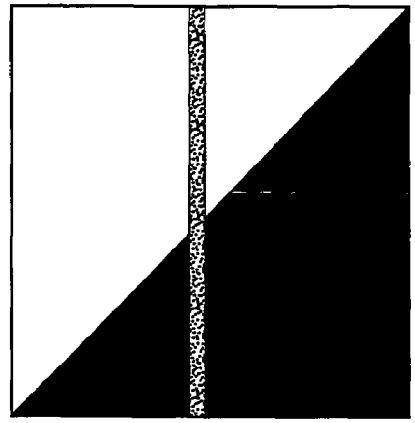
FIG. 5 is an illustrative diagram of image data containing a vertical mark.
Figure 6:
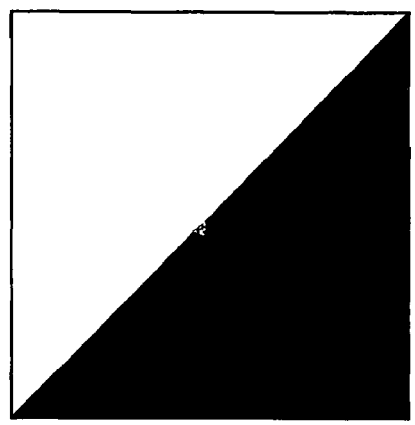
FIG. 6 is an illustrative diagram of image data after interpolation on the basis of a conventional method.
Figure 7:
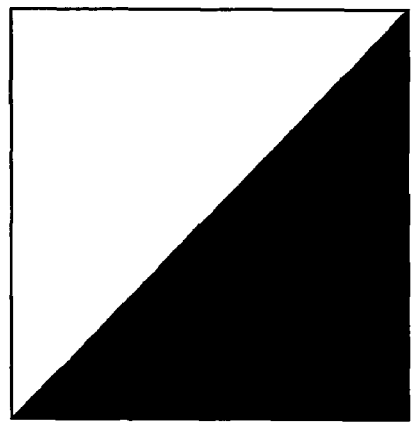
FIG. 7 is an illustrative diagram of image data after interpolation on the basis of the method according to the present embodiment.

According to the pixel interpolation method of the present embodiment, the vertical mark in FIG. 5 can be interpolated in an orderly fashion, as illustrated in FIG. 7.

I claim:

1. A pixel interpolation method for interpolating image data for a green pixel captured by an electronic imaging device having a Bayer arrangement, wherein, taking the image data of a red pixel situated at row M and column N to be RMN, taking the image data of a green pixel situated at row M and column N to be GMN, taking the image data of a blue pixel situated at row M and column N to be BMN, and taking the image data of an interpolation pixel situated at row M and column N to be XMN;

calculating ave by: ave=(G(M−1)(N−1)+G(M−1)(N+1)+G(M+1)(N−1)+G(M+1)(N+1))/4;

calculating horiz by: horiz=median (GM(N−2), (G(M−1)(N−1)+G(M+1)(N−1))/2, (G(M−1)(N+1)+G(M+1)(N+1))/2, GM(N+2));

calculating Slash by: Slash=median (G(M−2)(N+2), G(M−1)(N+1), G(M+1)(N−1), G(M+2)(N−2));

calculating Bslash by: Bslash=median(G(M−2)(N−2), G(M−1)(N−1), G(M+1)(N+1), G(M+2)(N+2)); and taking the image data of said interpolation pixel XMN as the value of said horiz value, said Slash value and said Bslash value which produces the smallest differential with respect to said ave value.

2. A pixel interpolation method for interpolating image data for either one of a blue pixel or a red pixel captured by an electronic imaging device having a Bayer arrangement, wherein, taking the image data of a red pixel situated at row M and column N to be RMN, taking the image data of a green pixel situated at row M and column N to be GMN, taking the image data of a blue pixel situated at row M and column N to be BMN, and taking the image data of an interpolation pixel situated at row M and column N to be XMN;

calculating GM(N−2) by: GM(N−2)=(G(M−1)(N−2)+G(M+1)(N−2))/2;

calculating CrM(N−2) by: CrM(N−2)=RM(N−2)−GM(N−2);

calculating GM(N+2) by: GM(N+2)=(G(M−1)(N+2)+G(M+1)(N+2))/2;

calculating CrM(N+2) by: CrM(N+2)=RM(N+2)−GM(N+2);

calculating GMN by: GMN=(G(M−1)N+GM(N−1)+GM(N+1)+G(M+1)N)/4; and calculating XMN by: XMN=(CrM(N−2)+CrM(N+2))/2+GMN.

* * * * *